(12) United States Patent
Plusquellic et al.

(10) Patent No.: US 11,411,751 B2
(45) Date of Patent: Aug. 9, 2022

(54) CORRELATION-BASED ROBUST AUTHENTICATION TECHNIQUE USING HELPER DATA ONLY

(71) Applicant: UNM Rainforest Innovations, Albuquerque, NM (US)

(72) Inventors: James Plusquellic, Albuquerque, NM (US); Matt Areno, Round Rock, TX (US)

(*) Notice: Subject to any disclaimer, the term of this patent is extended or adjusted under 35 U.S.C. 154(b) by 0 days.

(21) Appl. No.: 17/256,127

(22) PCT Filed: Jun. 27, 2019

(86) PCT No.: PCT/US2019/039417
§ 371 (c)(1),
(2) Date: Dec. 24, 2020

(87) PCT Pub. No.: WO2020/006178
PCT Pub. Date: Jan. 2, 2020

(65) Prior Publication Data
US 2021/0135887 A1  May 6, 2021

Related U.S. Application Data

(60) Provisional application No. 62/690,650, filed on Jun. 27, 2018.

(51) Int. Cl.
*G06F 7/04* (2006.01)
*G06F 15/16* (2006.01)
*H04L 29/06* (2006.01)
*H04L 9/32* (2006.01)
*H04L 9/40* (2022.01)

(52) U.S. Cl.
CPC ........ *H04L 9/3278* (2013.01); *H04L 63/0869* (2013.01)

(58) Field of Classification Search
CPC .................... H04L 9/3278; H04L 63/0869
See application file for complete search history.

(56) References Cited

U.S. PATENT DOCUMENTS

| 2008/0229119 A1* | 9/2008 | Skoric ............. G11B 20/00876 713/193 |
| 2011/0191837 A1* | 8/2011 | Guajardo Merchan ..................... H04L 9/0866 726/6 |
| 2012/0183135 A1* | 7/2012 | Paral ........................ G09C 1/00 380/44 |
| 2014/0325237 A1 | 10/2014 | Van Der Leest et al. |
| 2015/0341792 A1* | 11/2015 | Walsh ................... H04L 9/3278 713/171 |
| 2016/0156476 A1* | 6/2016 | Lee ......................... H04L 9/088 380/44 |
| 2016/0188296 A1 | 6/2016 | Plusquellic |
| (Continued) | | |

FOREIGN PATENT DOCUMENTS

WO  WO-2016100402 A1 *  6/2016 ........... G06F 21/604

OTHER PUBLICATIONS

International Search Report, issued in PCT/US2019/039417, dated Oct. 3, 2019, Moscow, Russia.

*Primary Examiner* — Phy Anh T Vu

(57) ABSTRACT

A privacy-preserving, mutual PUF-based authentication protocol that uses soft data to exchange and correlate Helper Data bitstrings instead of PUF response bitstrings as a means of authenticating chips to prevent attacks.

7 Claims, 15 Drawing Sheets

(56) References Cited

U.S. PATENT DOCUMENTS

| | | | |
|---|---|---|---|
| 2017/0126415 A1* | 5/2017 | Deyati | H04L 9/3278 |
| 2017/0364709 A1* | 12/2017 | Plusquellic | G06F 21/71 |
| 2018/0241557 A1* | 8/2018 | Maes | H03M 13/6356 |
| 2018/0351753 A1* | 12/2018 | Gardner | H04L 9/3218 |
| 2019/0007222 A1* | 1/2019 | Noguchi | H04L 9/3278 |
| 2019/0026457 A1* | 1/2019 | Plusquellic | G06F 21/30 |
| 2019/0028283 A1* | 1/2019 | Sharifi | G06F 21/86 |
| 2019/0147967 A1* | 5/2019 | Tuyls | G11C 17/18 |
| | | | 365/96 |
| 2019/0268170 A1* | 8/2019 | Plusquellic | G09C 1/00 |
| 2020/0076604 A1* | 3/2020 | Argones Rua | H04L 9/30 |
| 2021/0152349 A1* | 5/2021 | Van Der Sluis | H04L 9/08 |

* cited by examiner

CORRELATION-BASED ROBUST AUTHENTICATION TECHNIQUE USING HELPER DATA ONLY

CROSS-REFERENCE TO RELATED APPLICATIONS

This invention claims priority to U.S. Provisional Patent Application Ser. No. 62/690,650 filed Jun. 27, 2018.

FIELD OF THE INVENTION

The invention relates to protocols for authentication of the Internet of Things (IoT) and embedded applications. A privacy-preserving, mutual PUF-based authentication protocol exchanges and correlates Helper Data bitstrings instead of PUF response bitstrings as a means of authenticating chips to prevent attacks. Specifically, the invention leverages a physical unclonable function (PUF) architecture to produce soft data that captures the inherent, random variations that occur in signals from one integrated circuit chip to another, and represents the source of entropy for the PUF. The soft data is converted into bitstrings for use as input to a correlation-based robust authentication technique.

BACKGROUND OF THE INVENTION

Robust authentication and key generation are critically important to defining a root of trust and to providing data integrity and confidentiality in communications between Internet-of-things (IoT) devices. Physical unclonable functions (PUFs) are proposed as replacements for traditional non-volatile memory (NVM) for storing keys and for using cryptographic primitives in authentication protocols. PUFs are able to reproduce keys and bitstrings on-the-fly by measuring small changes in the signal behavior of an integrated circuit that occur because of the finite, non-zero tolerances that exist in manufacturing processes.

A special class of so-called strong PUFs are able to generate uncountable numbers of reproducible bits, making it possible to construct unique response bitstrings for authentication protocols without the need to employ entropy-enhancing cryptographic primitives, such as secure hash, thereby reducing energy and area overheads in IoT devices.

PUF-based authentication protocols that allow direct access to the embedded PUF through an unprotected interface, where challenges and responses are not obfuscated using cryptographic primitives, represent the most attractive usage scenario because such protocols are typically very simple and compact. The drawback of protocols with unprotected interfaces is that the embedded PUF is susceptible to model-building attacks. Model-building is typically carried out using machine learning (ML) algorithms where the goal of the adversary is to build a model of the challenge-response behavior of the PUF and then later use the model to predict the PUF's response to any arbitrary challenge. If this can be accomplished, then the model can be used to impersonate the actual device. Although ML attacks require a large amount of computing effort, they represent a serious threat to PUF-based authentication protocols with unprotected interfaces.

Accordingly, there is a need for an improved privacy-preserving, mutual PUF-based authentication protocol that does not utilize PUF response bitstrings as a means to authenticate chips. The present invention satisfies this need by exchanging and correlating Helper Data bitstrings as a means for authenticating chips.

SUMMARY OF THE INVENTION

The invention is directed to a PUF-based, privacy-preserving, mutual authentication protocol with unprotected interfaces that is resilient to model-building attacks. The technique is demonstrated using the hardware-embedded delay PUF (HELP) but is applicable to any PUF architecture that is able to produce soft data. Soft data refers to digital values that represent the magnitude of the signal being measured, for example, path delays and frequencies and metal resistance such as voltage or current. Soft data captures the inherent, random variations that occur in these signals from one chip, or token, to another and represents the source of entropy for the PUF. The protocol can therefore be applied to an enhanced version of the arbiter PUF and to traditional weak PUFs, such as the Ring Oscillator ("RO") PUF, with additional but simple enhancements to expand the challenge-response space from n to 2n as required for authentication applications.

The PUF architecture typically defines a set of functions that convert soft data into bitstrings and keys to be used for encryption and authentication. The authentication protocol according to the invention uses soft data, and the corresponding Helper Data bitstrings that are produced by the PUF architecture, as input to a correlation technique referred to as correlation-based robust authentication. By correlating Helper Data bitstrings, a server can correctly and securely authenticate a fielded chip or fielded device (also referred to as a token or a client). Advantageously, there is no need to reveal the response bitstrings in the message exchanges between the chip and server and therefore, the traditional approach of applying machine-learning algorithms to the challenge-response-pairs (CRPs) is no longer possible.

Helper Data bitstrings are derived from the PUF response bitstrings and therefore, the Helper Data bitstrings inherit the randomness and uniqueness characteristics associated with the PUF's source of entropy. By eliminating PUF response bitstrings in the message exchanges between the client and server, attacks such as model-building are much more difficult to carry out.

Advantageously, the message exchange between the server and chip reveal no information related to the PUF secrets, making the authentication protocol resilient to impersonation, machine-learning and other types of attacks commonly carried out against PUF-based authentication protocols.

In the authentication protocol, the chip constructs and transmits a Helper Data bitstring to the server. The Helper Data bitstring transmitted is normally used by the server to identify weak bits in the response bitstring, but otherwise reveals no information about the response bitstring itself. The server constructs a set of Helper Data bitstrings using enrollment data that it stores for all valid chips in a secure database. The chip's Helper Data bitstring is correlated to each of the server generated Helper Data bitstrings by bitwise AND'ing the two bitstrings and then counting the number of '1's in the AND'ed bitstring. It is contemplated that other alternatives to bitwise AND correlation are possible including bitwise XNOR and traditional time and frequency domain digital signal processing forms of correlation.

The server authenticates the chip if one of the Helper Data bitstrings constructed using enrollment data correlates, i.e., has a large number of '1's, to the chip's Helper Data bitstring. A similar process is carried out in reverse from server to chip to enable mutual (two-way) authentication but without the exhaustive search component. Therefore, no information regarding the PUF secrets is revealed to the adversary despite the fact that the Helper Data bitstrings are derived from random variations that occur within the PUF's circuit components, These and other exemplary features and advantages of the present invention will become clear from the following description with reference to the accompanying drawings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the presented detailed description. The description and accompanying drawings may highlight a certain specific example, or a certain aspect of the invention, However, one skilled in the art will understand that portions of the example or aspect may be used in combination with other examples or aspects of the invention.

DETAILED DESCRIPTION OF THE INVENTION

Figure 1:
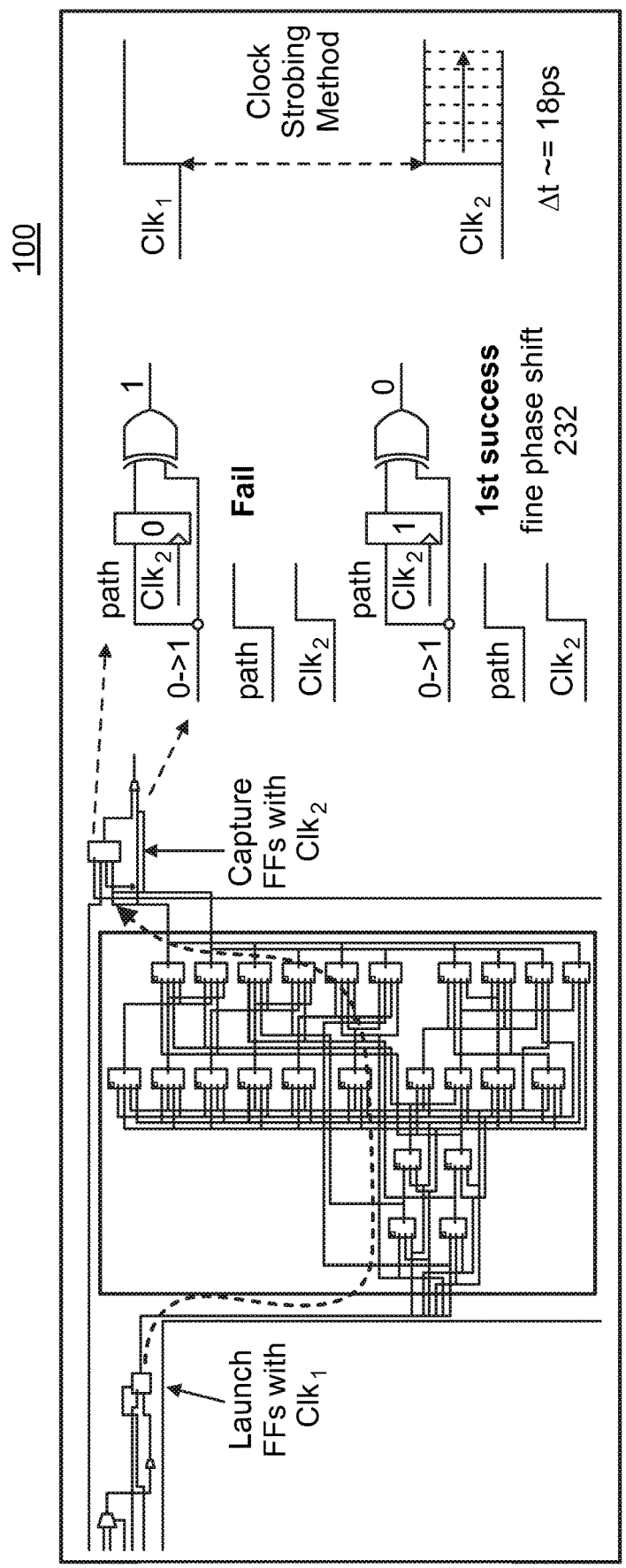
FIG. 1 illustrates a block diagram of a HELP architecture according to an embodiment of the invention.

The invention relates to a privacy-preserving, mutual PUF-based authentication protocol exchanges and correlates Helper Data bitstrings instead of PUF response bitstrings as a means of authenticating chips to prevent attacks. A physical unclonable function (PUF) architecture produces soft data that captures the inherent, random variations that occur in signals from one chip to another, and represents the source of entropy for the PUF. The soft data is converted into bitstrings for use as input to a correlation-based robust authentication technique.

A wide range of PUF architectures are known. The source of entropy (randomness) for the PUF is chip-to-chip and within-die process variations that occur between and within chips from the population. The PUF architecture defines the mechanism that is used to measure small signal variations introduced by process variations effects. In some cases, the measurement process leverages the existing architectural features of the chip, e.g., the SRAM PUF measures its entropy source, i.e., the individual SRAM cells, by simply applying power to the SRAM array. For most PUFs, however, circuit components need to be added to the chip, e.g., the RO PUF requires a set of MUXs and counters to select and measure the frequencies associated with elements in the array of ROs.

In another example, the HELP PUF adds a launch-capture clocking mechanism to precisely time the delays of combinational logic paths. For PUF architectures that measure and digitize the signal behavior associated with the entropy source, the digitized values provide additional information that can be leveraged in strong challenge-response-pair (CRP) forms of authentication. The digitized values represent the magnitude of the signal behavior, e.g., RO frequency or path delay, and are often used as input to mathematical processes defined by the PUF architecture. The goal of the mathematical operations is to amplify the differences which occur among multiple copies of the individual circuit components that represent the source of entropy. The digitized values is referred to as soft data and are eventually converted to a bit and used in the response of the CRP.

Of the PUF architectures that create soft data (the RO and HELP PUFs are just two examples), the conversion to bits can be accomplished in a variety of ways. For example, the RO PUF typically selects a pair of ROs and then computes a difference by subtracting the soft data associated with the two ROs. The sign of the difference can then be used to generate a bit, with, e.g., negative differences producing a '0' and positive differences producing a '1'. The HELP PUF also computes differences among pairings of path delays and uses a Modulus operation to assign a '0' or '1' to the difference.

Nearly all PUF architecture also need to deal with bit-flip errors, which are differences in the response bitstring that occur when the response is regenerated. Bit-flip errors are most probable when the magnitude of the difference, e.g., between two RO frequencies, is close to zero. In these cases, regeneration, which takes place later in the field and under potentially adverse environmental conditions, can result in the sign of the difference changing and the corresponding bit flipping from '0' to '1' or vice versa. Although authentication protocols can be designed to be tolerant to a small number of bit-flip errors, the number of bit-flip errors that can occur is too large in most PUF architectures to guarantee that authentication works correctly when regeneration is carried out in hash environments.

To deal with this issue, nearly all PUF architectures define an error correction or error avoidance method to improve reliability during regeneration. Error correction is the more popular of the two reliability-enhancing methods. Error correction typically processes the PUF response bits into a final response bitstring using algorithms based on linear block codes or Bose-Chaudhuri-Hochquenghen (BCH) codes. However, nearly all of the error correction schemes ignore the magnitude of the difference in the soft data and use all of the PUF response bits, including those that have a high probability of producing bit-flip errors, to construct a smaller but reproducible bitstring response.

Error avoidance schemes, on the other hand, integrate a thresholding method that skips bits that are deemed unreliable. The reliability of a bit is often directly related to the soft data associated with the bit, and in particular, the distance of the soft data value to the bit-flip line. The bit-flip line is defined by the PUF architecture as a soft threshold between '0' or a '1'. Unlike error correction methods, error avoidance methods can only be used with PUF architectures that produce soft data values, e.g., the RO, metal resistance and the HELP PUFs are some examples.

In typical usage scenarios, an enrollment phase is carried out in which challenges are applied to the PUF in a secure facility and response bitstrings are generated for the first time. In addition to the response bitstring, PUF architectures that use either error correction or error avoidance methods also produce Helper Data bitstrings. Helper Data bitstrings are typically stored by the secure facility and transmitted to the fielded device later during regeneration to enable the PUF on the device to precisely reproduce the response bitstring. The form of the generated Helper Data bitstrings varies dramatically depending on the error correction or avoidance method employed. A key contribution of the invention relates to Helper Data bitstrings, and in particular to Helper Data bitstrings that is generated by error avoidance methods.

To exemplify the principles of the proposed technology, a HELP PUF architecture is used with data collected from a set of Zynq FPGAs. HELP uses a launch-capture technique to obtain accurate digital timing values of path delays through a combinational logic block.

FIG. 1 illustrates a block diagram of a HELP architecture 100 including the combinational logic block for a full adder. However, any functional unit can be used. For example, the combinational logic from one column of the Advanced Encryption Standard (AES) may be used. As shown in FIG. 1, clock strobing is used to create path delay (timing) soft data. Logic signal transitions are launched from the Launch FFs shown on the left using $Clk_1$ and captured in the Capture FFs shown on the right using $Clk_2$.

The digital clock manager (DCM) on the FPGA is used to create the clocks, with dynamic fine phase shift enabled for $Clk_2$. Dynamic fine phase shift allows a state machine running in the programmable logic (PL) of the FPGA to increment the phase shift by increments of 18 ps as shown on the right side of FIG. 1. A path through the full adder is timed by repeatedly applying a 2-vector sequence to the Launch FFs until the signal propagating along the path shown is successfully captured in the Capture FE A successful capture occurs in this example when the '0' produced from the first vector $V_1$ of the 2-vector sequence is overwritten by the '1' produced by $V_2$ as illustrated in the middle portion of FIG. 1. When this occurs, the current fine phase shift value, which is an integer between 0 and approx. 500, is recorded by HELP as the digitized timing value for this path. These timing values represents the soft data associated with HELP.

Figure 2:
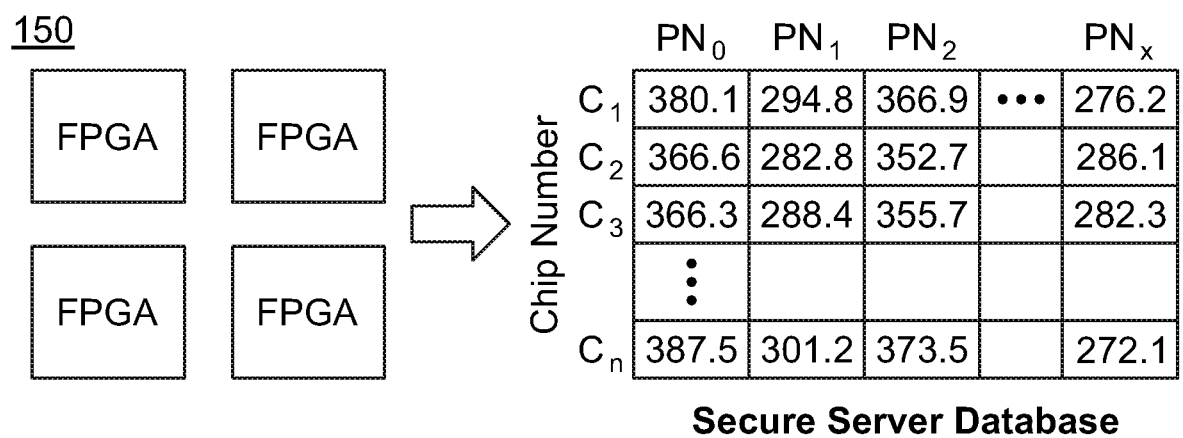
FIG. 2 illustrates a block diagram of a HELP PN database created during enrollment according to an embodiment of the invention.

During enrollment, a set of timing values, called PUF Numbers ("PN") for each chip are stored in the rows of a secure database 150 as shown in FIG. 2. This data is consulted by the secure server to authenticate these chips after they are deployed in fielded systems. The storage of soft data on the server, in contrast to response bitstrings, is the first of several significant differences that exist between the correlation-based robust authentication technique of the invention and the current known PUF-based protocols. As indicated above, the proposed protocol leverages Helper Data bitstrings to carry out authentication. The Helper Data bitstrings are derived from the PNs stored in the secure database on the server, and from an instance of HELP that is programmed into the PL side of an FPGA representing the fielded device (also referred to as a chip or a token). The entropy that is associated with each token is captured by the PN stored in the server database. An adversary carrying out machine learning attacks against the protocol would attempt to learn the timing information stored in the database by reverse-engineering the bitstring responses that are exchanged openly over the network. Once learned, the adversary can then impersonate the token. Therefore, it is vital that the relationship between the PN and the response bitstring be obscured and remain hidden to make this task difficult or impossible for the adversary.

FIG. 3A-FIG. 3C and FIG. 4A-FIG. 4C illustrate how bitstrings and Helper Data bitstrings are generated by FPGAs using an error avoidance scheme called Margining, as a precursor to the correlation correlation-based robust authentication technique. The environmental conditions for data collected during enrollment and stored in the secure database are specified as 25° C. under nominal supply voltage conditions (1.00V) while to fielded tokens are subjected to high temperature (85° C.) and low supply voltage conditions (−5% or 0.95V).

Figure 3A:
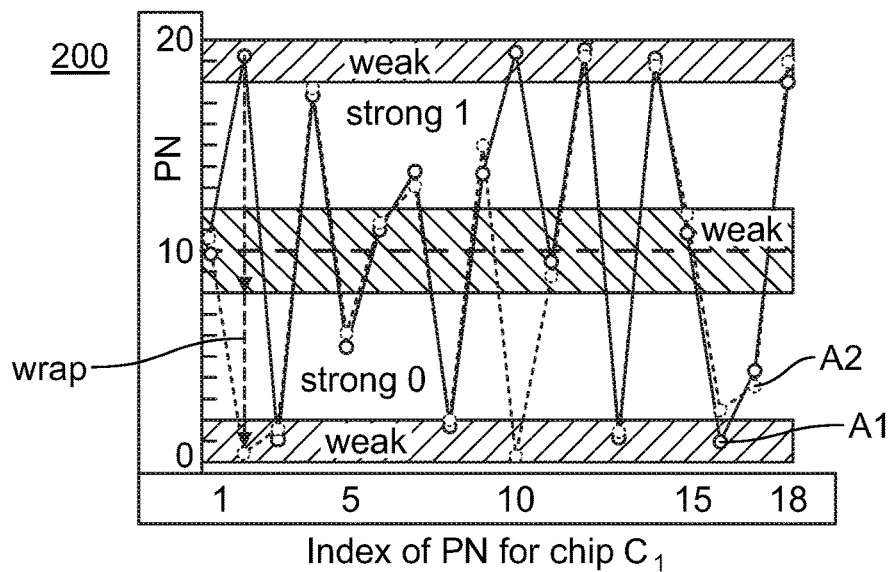
FIG. 3A illustrates a graph of an index of PN for a first integrated circuit under enrollment and regeneration conditions.
Figure 4A:
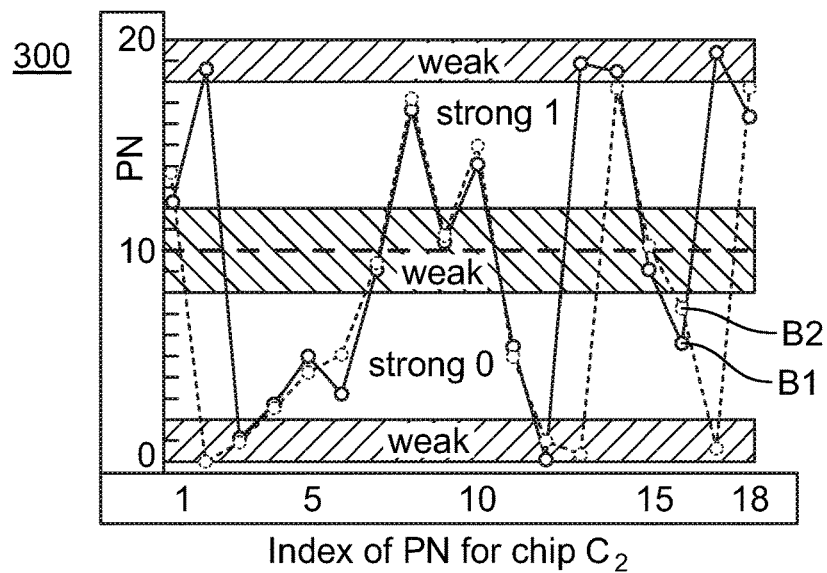
FIG. 4A illustrates a graph of an index of PN for a second integrated circuit under enrollment and regeneration conditions.

FIG. 3A illustrates a graph 200 of an index of PN for a first integrated circuit ("token C1") and FIG. 4A illustrates a graph 300 of an index of PN for a second integrated circuit ("token C2") under enrollment and regeneration conditions. Each graph 200, 300 plots a set of 18 PN (timing values) along the x-axis. PN obtained from the secure server database are shown by curves "A1", "B1" and the PN generated on-the-fly by these chips during regeneration in the field are shown by "A2", "B2". Un-compensated temperature-voltage noise ("TVNoise") causes the offset seen between curves "A1" and "A2" seen in FIG. 3A and "B1" and "B2" seen in FIG. 4A. An interesting example labeled 'wrap' is shown for the 2nd data point in the FIG. 3A where TVNoise has caused the point to 'wrap' from the enrollment value near 20 back around to a value near 0 during regeneration.

Despite these anomalies, curves "A1"/"A2" and curves "B1"/"B2" seen in each graph track very closely, i.e., they are correlated.

The HELP PUF converts the PN into a bitstring by applying the following algorithm, First, a pseudo-random number generator selects pairs of PN and creates differences. A temperature-voltage compensation method ("TVComp") is then applied to the differences to compensate the measured timing values for changes introduced by environmental conditions. Finally, a Modulus operation is applied to the compensated differences to remove path length bias effects.

The Modulus operation is defined in the standard way as returning the positive remainder after dividing by the Modulus. The value of the Modulus is one of several parameters to the HELP algorithm. The graphs shown in FIG. 3A and FIG. 4A use a Modulus of 20, which is reflected as the maximum value given on the y-axis.

As mentioned earlier, the error avoidance scheme implemented within HELP is called Margining. The Margining scheme skips soft data values—i.e., PN—in cases where the probability of a bit-flip error is large. These highly probable bit-flip regions are labeled "weak" in the center of graph 200 in FIG. 3A and graph 300 in FIG. 4A, and are located adjacent to the bit-flip lines 0, 10 and 20. In other words, PN that are within a distance of 2.0 of these bit-flip lines have the highest probability of changing value. For example, the PN labeled "wrap" represents a bit-flip error which is introduced by un-compensated TVNoise. PN that are located in the "weak" regions are assigned '0' in the Helper Data bitstring.

Figure 3B:
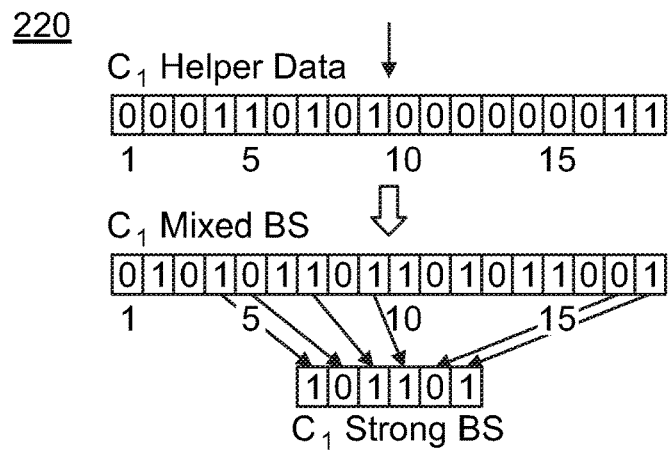
FIG. 3B illustrates a diagram of server Helper Data bitstrings and response bitstrings for the first integrated circuit under enrollment conditions.

FIG. 3B illustrates a diagram 220 of server Helper Data bitstrings and response bitstrings for the first integrated circuit under enrollment conditions. As shown, the "C1 Helper Data" bitstrings begins with "000", which reflects that the status of the first 3 PN in the "A1" curve of graph 200 of FIG. 3A. In contrast, the 4th bit is '1' because the PN at position 4 in graph 200 of FIG. 3A falls within the "strong 1" region, The "C1 Mixed BS" in FIG. 3B records the bit value associated with each of the 18 PN, with PN<10.0 assigned '0' and those >=10.0 assigned '1'. This response bitstring corresponds one-to-one to the "C1 Helper Data" bitstring and contains both strong and weak bits. The "C1 Strong BS" is constructed from the "C1 Mixed BS" by selecting only those bits identified as strong in the "C1 Helper Data" bitstring, FIG. 4B illustrates server Helper Data bitstrings and response bitstrings for the second integrated circuit under enrollment conditions.

Figure 3C:
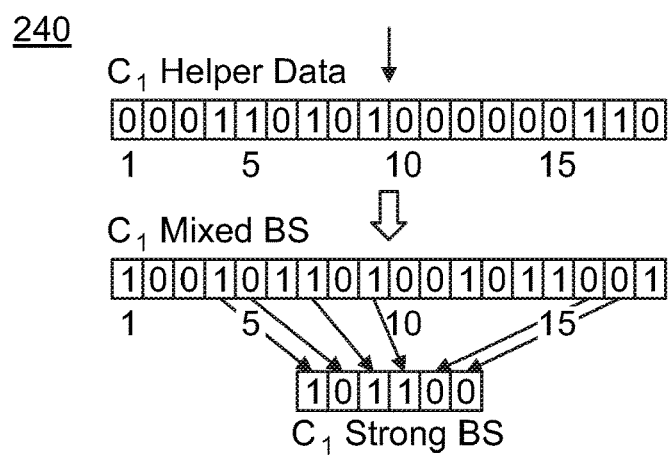
FIG. 3C illustrates a diagram of chip Helper Data bitstrings and response bitstrings for the first integrated circuit under regeneration conditions.

FIG. 3C illustrates a diagram 240 of token Helper Data bitstrings and response bitstrings for the first integrated circuit under regeneration conditions. FIG. 3C illustrates corresponding bitstrings generated using the regeneration data points of curve "A2" from graph 200 of FIG. 3A. FIG. 4C illustrates a diagram 340 of token Helper Data bitstrings and response bitstrings for the second integrated circuit under regeneration conditions. FIG. 4C illustrates corresponding bitstrings generated using the regeneration data points of curve "B2" from graph 300 of FIG. 4C.

Figure 4B:
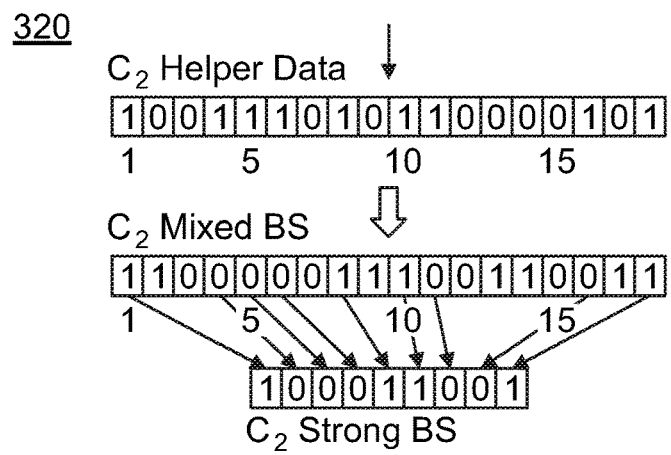
FIG. 4B illustrates a diagram of server Helper Data bitstrings and response bitstrings for the second integrated circuit under enrollment conditions.
Figure 4C:
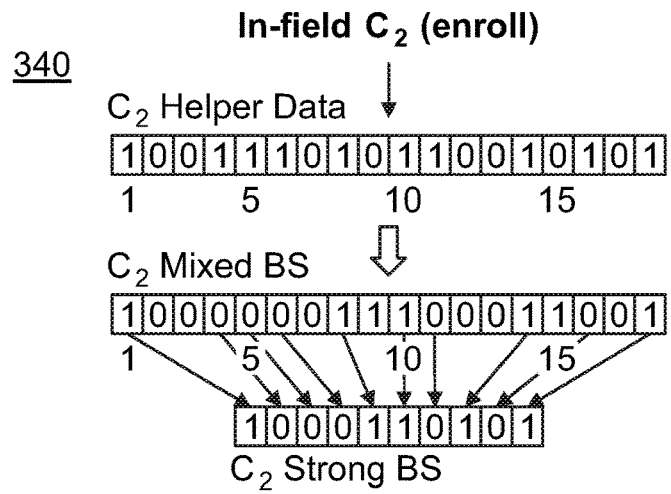
FIG. 4C illustrates a diagram of chip Helper Data bitstrings and response bitstrings for the second integrated circuit under regeneration conditions.

One known HELP authentication protocol describes a DualHelperData scheme where both the Helper Data bitstrings and Strong bitstrings are exchanged between the server modeled in FIG. 3B and FIG. 4B and the tokens modeled in FIG. 3C and FIG. 4C. As discussed, exposing the Strong bitstrings to the adversary enables model-building attacks where the adversary attempts to reverse engineer the PN stored in the secure database using machine learning (ML) algorithms. Although attempts to model-build HELP have not been successful to-date, the exposure of the response bitstrings still represents a vulnerability that enables ML attacks. If it becomes possible to construct an ML attack that is able to deduce the relationships among the PN, then the response bitstrings to other challenges can be predicted, and the token impersonated.

As a mitigation strategy for attacks, an authentication protocol exchanges only the Helper Data bitstrings, Authentication is carried out by correlating the Helper Data bitstrings generated using the enrollment data on the server with the Helper Data bitstring generated on-the-fly by the token. The simplest correlation strategy is to compute a new bitstring by bitwise AND'ing the Helper Data bitstrings from the server and token and then counting the number of '1's in the AND'ed version. The number of '1's is the correlation coefficient ("CC") because it reflects the level of similarity that exists between the two Helper Data bitstrings.

Figure 5A:
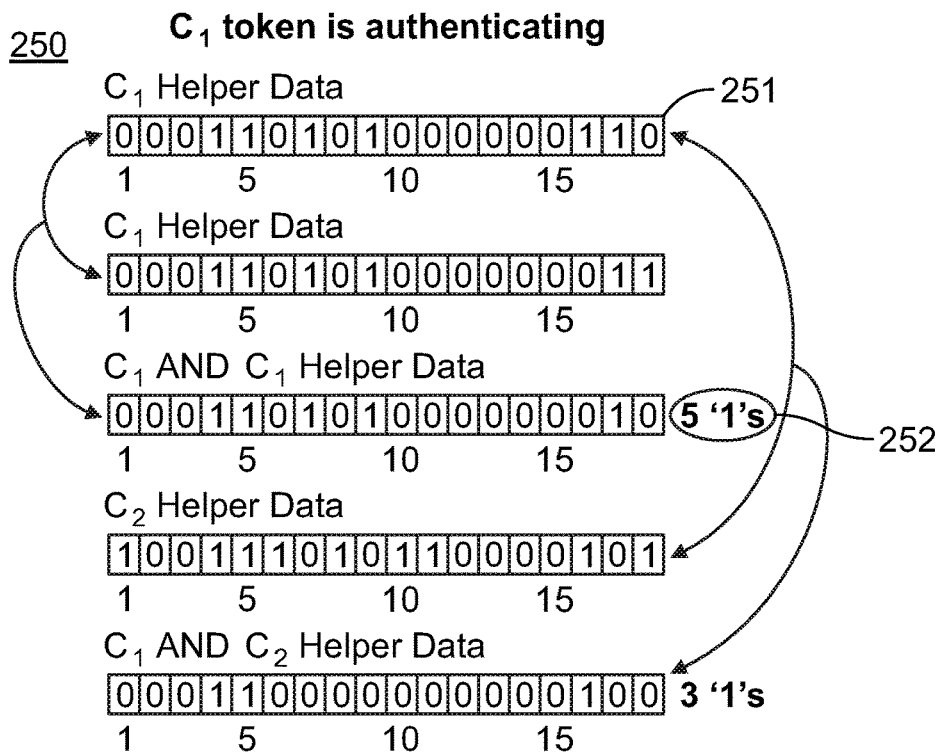
FIG. 5A illustrates a diagram of Helper Data bitstring correlation with the first integrated circuit authenticating to the server.
Figure 5B:
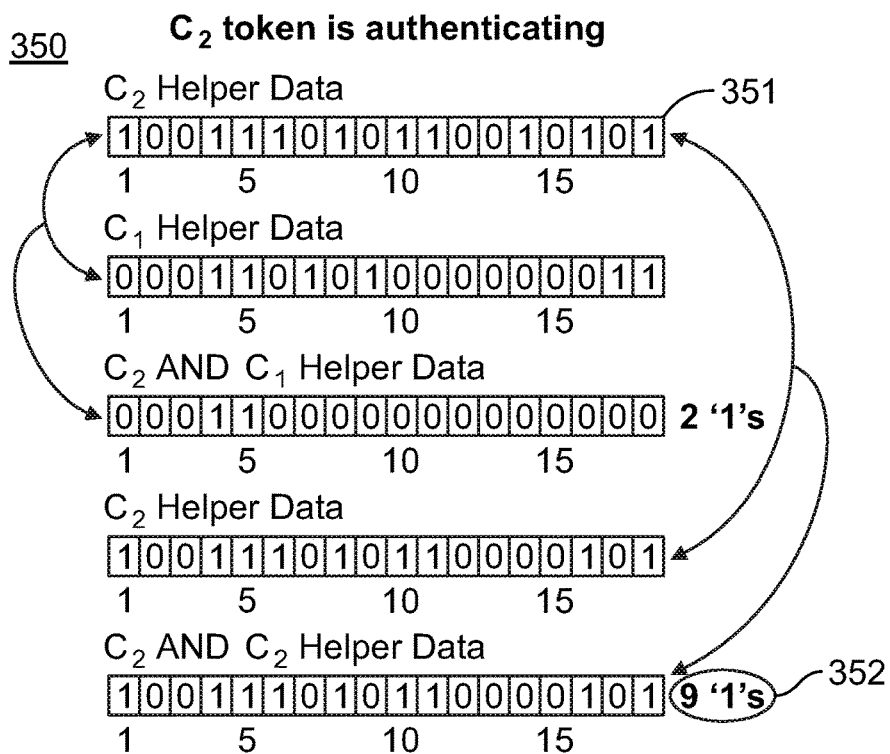
FIG. 5B illustrates a diagram of Helper Data bitstring correlation with the second integrated circuit authenticating to the server.

FIG. 5A illustrates a diagram 250 of Helper Data bitstring correlation with the first integrated circuit authenticating to the server and FIG. 5B illustrates a diagram 350 of Helper Data bitstring correlation with the second integrated circuit authenticating to the server. The Helper Data bitstrings are obtained from the soft data as shown in FIG. 3A-FIG. 4C. As an example, FIG. 5A shows an authentication attempt by token C1 while the right column shows an attempt by token C2. The top-most bitstrings 251, 351 in FIG. 5A and FIG. 5B, respectively, are the Helper Data bitstrings transmitted by the tokens to the server. For each Helper Data bitstring received, the server carries out an exhaustive search operation using the PN stored its secure database. The server constructs the Helper Data bitstrings in each column.

For each Helper Data bitstring it constructs, the server bitwise AND's it with the received token's Helper Data bitstring. For example, the AND'ed versions are labeled "C1 AND C1 Helper Data" and "C1 AND C2 Helper Data" in FIG. 5A. As discussed, the bitwise AND operation is a form of correlation that acts to preserve more '1's in cases where the bitstrings are similar. The CCs (number of '1's) are reported to the right of AND'ed Helper Data bitstrings as shown by 252 in FIG. 5A and 352 in FIG. 5B.

The results for both authentication attempts show higher correlation for cases where the server-generated Helper Data bitstring is derived from PN data that belongs to the token that is attempting to authenticate. In other words, the authenticating token is correctly identified to the server using only the information provided by the CC. This example uses only a small number of 18 PN from a larger set of 2048 PN that are produced by each iteration of the HELP algorithm.

Figure 6A:
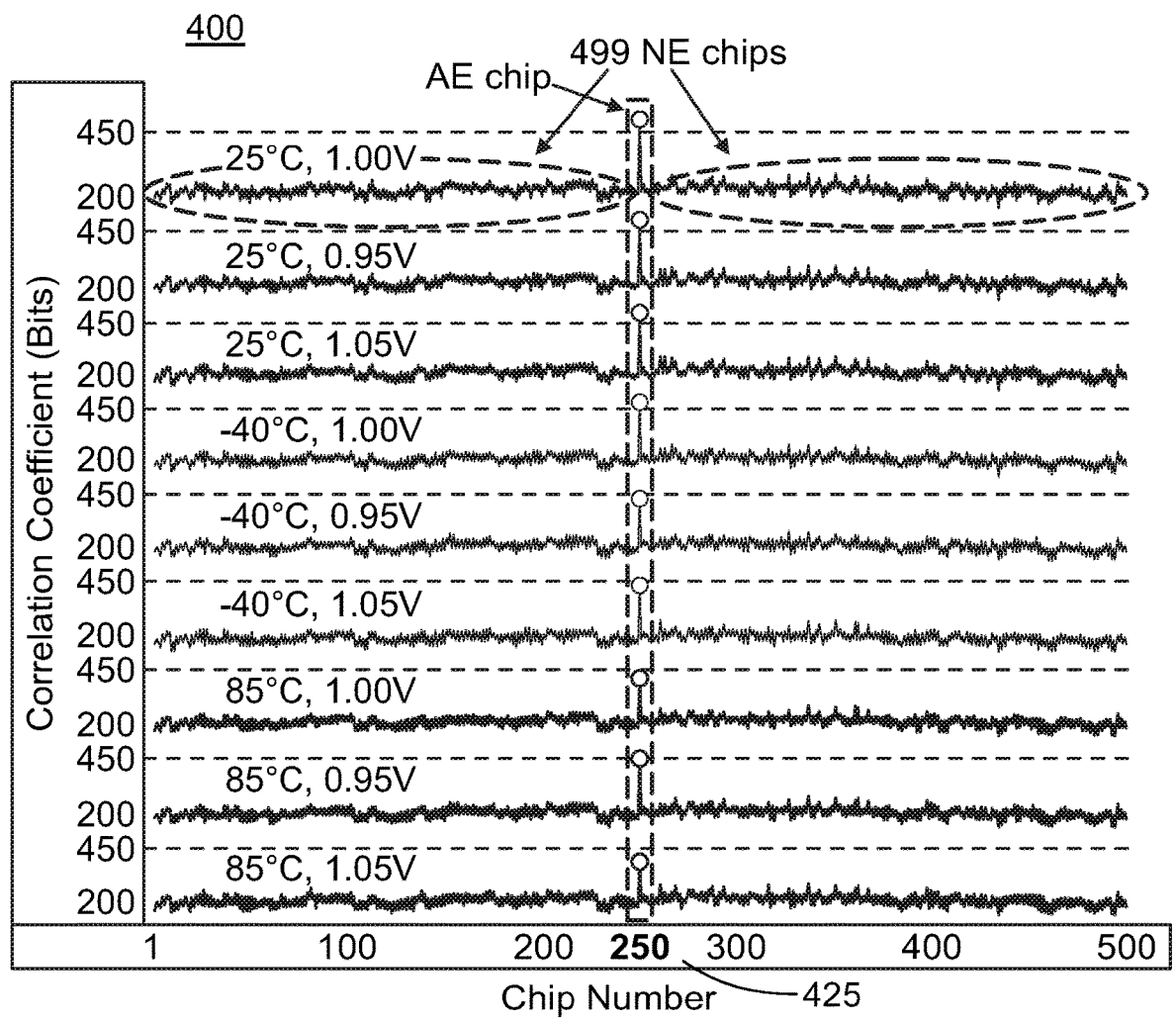
FIG. 6A illustrates a graph of Helper Data bitstring correlation for 500 chips across 9 TV corners.

Using 500 FPGAs, results shown in the graph 400 FIG. 6A illustrate the full length bitstrings and PN collected across 9 TV corners obtained by correlating Helper Data bitstrings from the HELP PUF with a Margin of 3 and a Modulus of 18. Each of the 9 curves plots the CCs (y-axis) for the 500 chips (x-axis), The authenticating token is labeled C250 as shown by 425.

Figure 6B:
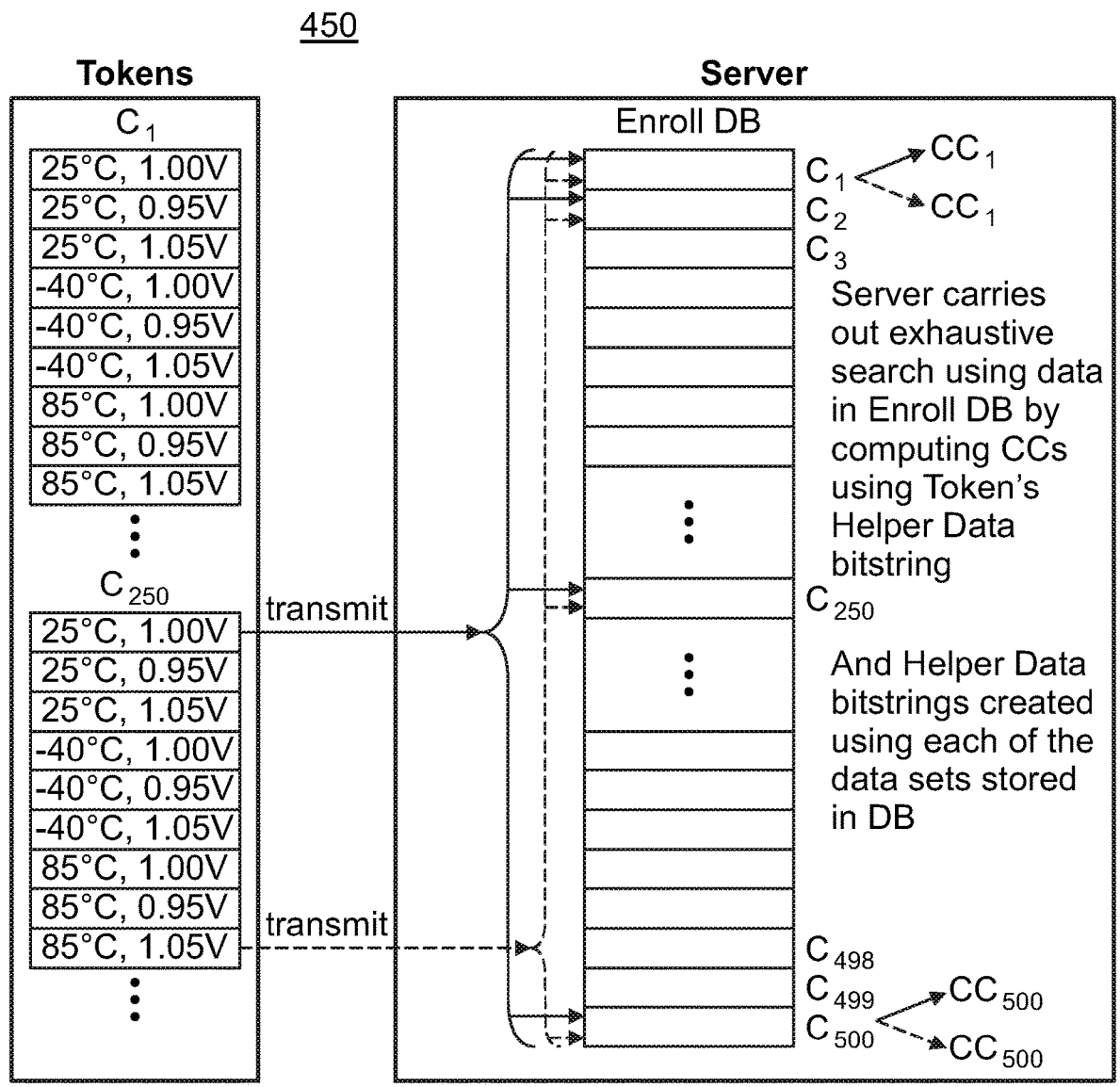
FIG. 6B illustrates a diagram of constructing curves from the Helper Data bitstring correlation of FIG. 6A.

The diagram 450 given in FIG. 6B shows how the curves in FIG. 6A are constructed. Here, the token's Helper Data bitstring on the left, regenerated under 25° C., 1.00V, is transmitted to the server on the right. A second authentication request is also shown where the token in this case is regenerating Helper Data with environmental conditions set to −40° C., 1.05V. The server carries out an exhaustive search using data stored in the Enroll DB separately for each of these two authentications and computes a set of 500 CCs. The CCs are plotted along the x-axis in FIG. 6A as the top-most and bottom-most curves. A similar process is carried out to construct the CCs for the remaining 7 curves in FIG. 6A but using PN from the other TV corners.

The CCs in FIG. 6A for C250 (referred to as the authentic-enrolled ("AE") chip) vary from more than 450 bits in the top curve to approx. 380 bits in the bottom curve. Although the correlation is weakened when the token is exposed to harsh environmental conditions, it still remains high with respect to the CCs produced by the remaining 499 chips (referred to as non-authentic-enrolled ("NE") chips) from the DB. The largest value from a NE chip is approx. 260. The large Margin between the AE and NE CCs indicates that the server defines a threshold to distinguish successful authentications from unsuccessful authentications with very high probability, e.g., any value between 260 and 380 works in this example.

Although only AE and NE authentication attempts are considered, it is also contemplated to include non-authentic-not-enrolled ("NN") and non-authentic-counterfeit ("NC") authentication attempts.

Figure 7A:
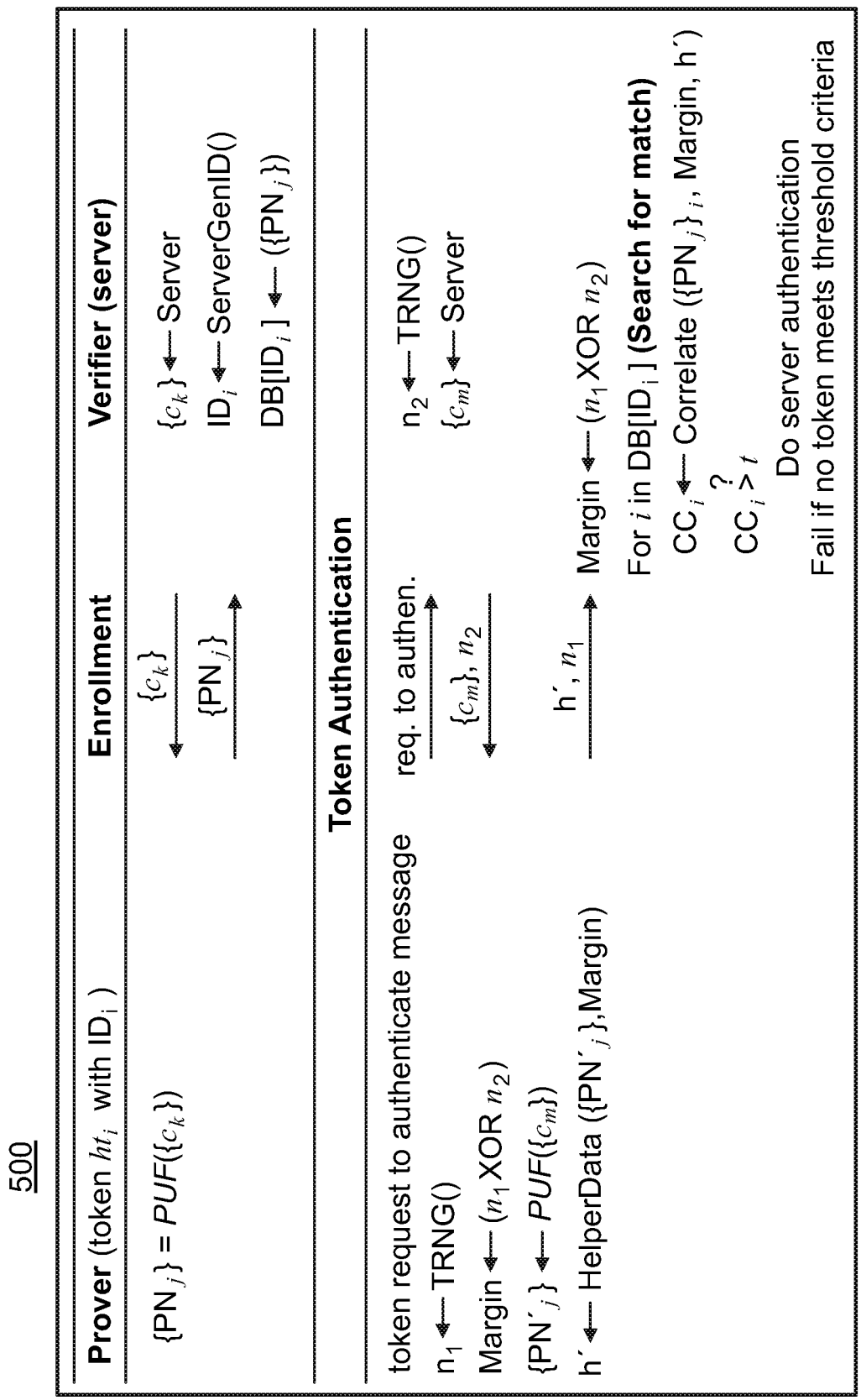
FIG. 7A illustrates a diagram of the improved privacy-preserving, mutual PUF-based authentication protocol according to the invention.

Under the AND correlation scheme, it is possible for adversaries to construct Helper Data bitstrings with all '1s', which guarantees a large number of matches. However, large CCs would occur for ALL data sets in the secure DB, which, in turn, would be flagged by the server and result in a failed authentication attempt. This is true because the server allows only one CC to be above the threshold in order for an authentication attempt to be classified as successful FIG. 7A illustrates a diagram 500 of the improved privacy-preserving, mutual PUF-based authentication protocol according to the invention. FIG. 7A illustrates the enrollment and chip authentication operations, including the message exchanges between the chip and server.

Figure 7B:
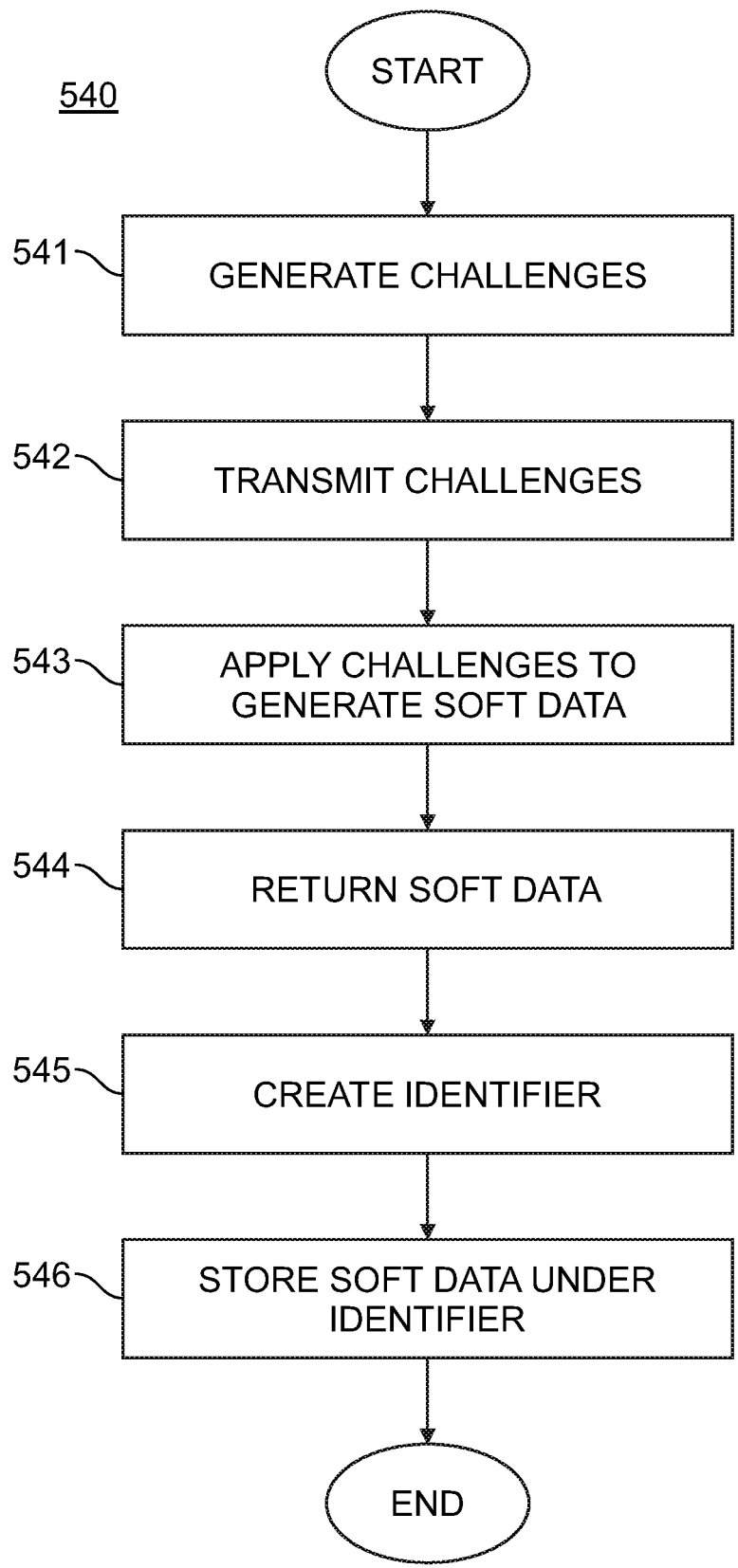
FIG. 7B illustrates a flow chart of steps performed by the correlation-based robust authentication technique according to the invention.
Figure 7C:
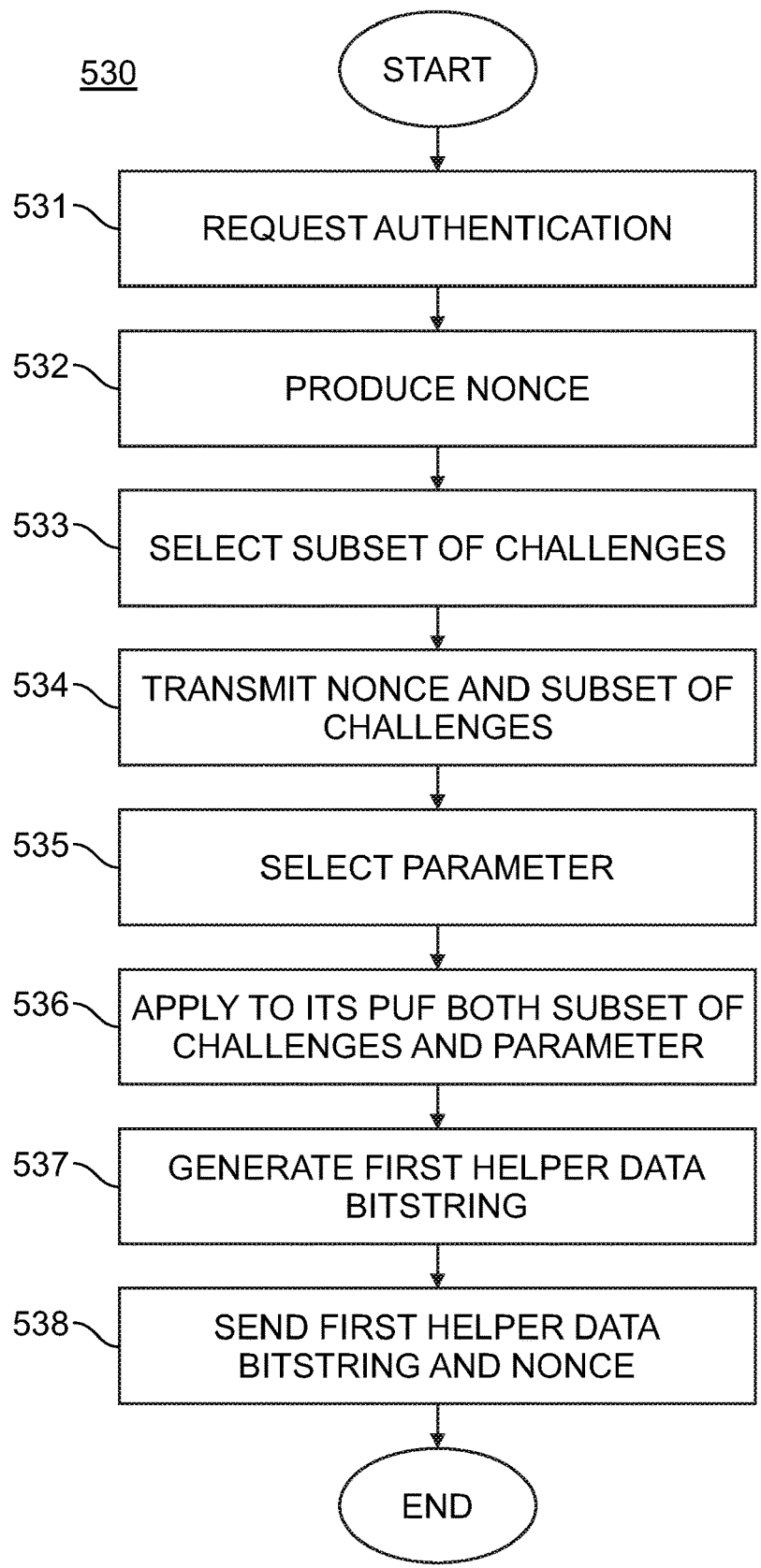
FIG. 7C illustrates a flow chart of steps performed by the correlation-based robust authentication technique according to the invention.
Figure 7D:
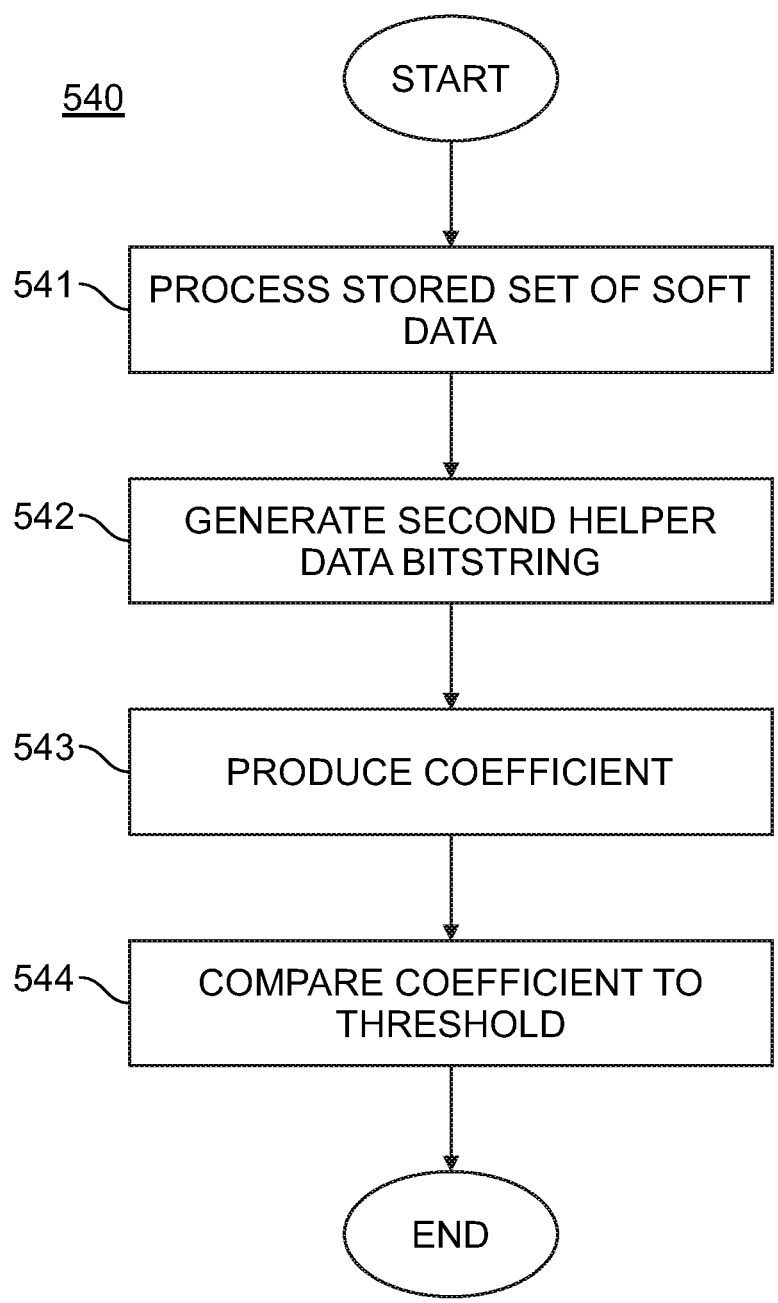
FIG. 7D illustrates a flow chart of steps performed by the correlation-based robust authentication technique according to the invention.

FIG. 7B-FIG. 7D illustrate flow charts of the steps performed by the correlation-based robust authentication technique according to the invention.

Enrollment is performed in a secure facility using a confidential FPGA programming bitstream that allows access to the PUF's soft data. FIG. 7B illustrates a flow chart 520 of steps performed by the correlation-based robust authentication technique shown in FIG. 7A. At step 521, the server generates challenges $\{c_k\}$. At step 522, the challenges $\{c_k\}$ are transmitted to the chip. The chip then applies the challenges to its PUF to generate the set $\{PN_j\}$ at step 523, which is returned to the server at step 524. The server generates a chip identifier $ID_i$ at step 525. At step 526, the server stores the soft data set $\{PN_j\}$ under $ID_i$ in its secure database DB.

FIG. 7C illustrates a flow chart 530 of steps performed by the correlation-based robust authentication technique directed to the first phase of authentication (chip authentication) for a HELP PUF. At step 531, a fielded chip i requests authentication to the server (note, no chip ID is transmitted to the server in order to preserve privacy). The server produces a nonce $n_2$ at step 532. At step 533, the server selects a set of challenges $\{c_m\}$. The challenges $\{c_m\}$ are a subset of the challenges $\{c_k\}$ used during enrollment. At step 534 both the nonce and subset of challenges are transmitted to the chip. The nonce $n_2$ is used to select a parameter at step 535. The parameter may be a Margin or a Modulus parameter. At step 536, the chip applies the challenges $\{c_m\}$ to its PUF, along with the parameter (i.e., Margin), which is selected using the XNOR of the chip and server generated nonces $n_1$ and $n_2$. At step 537 a Helper Data bitstring h' is generated, for example, using the Margining scheme described above. Both h' and $n_1$ are sent to the server at step 538.

The server then carries out an exhaustive search by processing soft data sets $\{PN_j\}_i$ it stores in its database for each chip i as shown at step 541 of the flow chart 540 in FIG. 7D. At step 542 a Helper Data bitstring h is generated internally using each of the stored data sets $\{PN_j\}_i$ and the same parameter (Margin) that was used by the chip. The Helper Data bitstring h' is then correlated with h based on a bitwise AND operation (discussed above), but other possibilities exist, e.g., bitwise XNOR or standard waveform correlation methods used in signal processing are possible. At step 543, a correlation coefficient CCE is produced that can then be compared to a threshold t at step 544. The threshold is predetermined, for example by using a characterization process in a secure facility. The goal of characterization is to select a threshold that unambiguously distinguishes authentic-enrolled chips (AE) from non-authentic-enrolled (NE), non-authentic-not-enrolled (NN) and non-authentic-counterfeit (NC) chips.

The last phase of the improved privacy-preserving, mutual PUF-based authentication protocol is for the chip to authenticate the server. This phase is not shown, but is identical except the message exchanges are reversed and the exhaustive search process is omitted. Server authentication is not performed unless chip authentication succeeds, in which case, the server has identified the chip's soft data set $\{PN_j\}_i$. The server uses this $\{PN_j\}_i$ to generate another Helper Data bitstring, which is transmitted to the chip. Note that the Helper Data bitstrings generated during server authentication are distinct from those generated during chip authentication because the challenge subset $\{c_m\}$ and nonces $n_1$ and $n_2$ are selected differently in this phase. In addition to the Margin parameter that are selected by nonces, other parameters can be introduced to further expand the CRP space, as known in reference to the HELP algorithm. Authentication succeeds if both of the chip and server authentication phases succeed, and fails otherwise.

Following are experimental results that present a worst case scenario. A larger set of the HELP CRP space is used. The data analyzed was collected from a set of 500 chip-instances under enrollment and 9 temperature-voltage (TV) corners.

The full CRP space of the HELP algorithm is defined by (1) sets of challenges (2-vector sequences) and corresponding Path-Select-Masks where each challenge set produces 4096 PN and (2) a set of parameters, consisting of two LFSR seeds, two floating point parameters called the reference mean and range, and a Modulus and Margin. The challenges and Path-Select-Masks create a CRP space with size exponentially related to the size of the functional unit used as the entropy source. The parameters increase the CRP space by approx. 221, i.e., there are 221 2048-bit bitstrings that can be generated by varying these parameters for each set of challenges and Path-Select-Masks. Only one set of challenges and Path-Select-Masks are used for the analysis in order to focus on analyzing Helper Data bitstrings produced by varying the parameters. Although this represents only a small subset of the entire CRP space, results show that the correlation-based robust authentication technique works well across this statistically significant sample.

The two LFSR seed parameters allow up to 2048 distinct bitstrings to be generated, each of length 2048 bits. The reference mean and range increase the number of distinct bitstrings by a factor of approx. 100. The analysis performed here analyzes the Helper Data bitstrings generated using 10 distinct LFSR seeds, one combination of the reference mean and range and a set of 11 Moduli and 3 Margins.

Figure 8A:
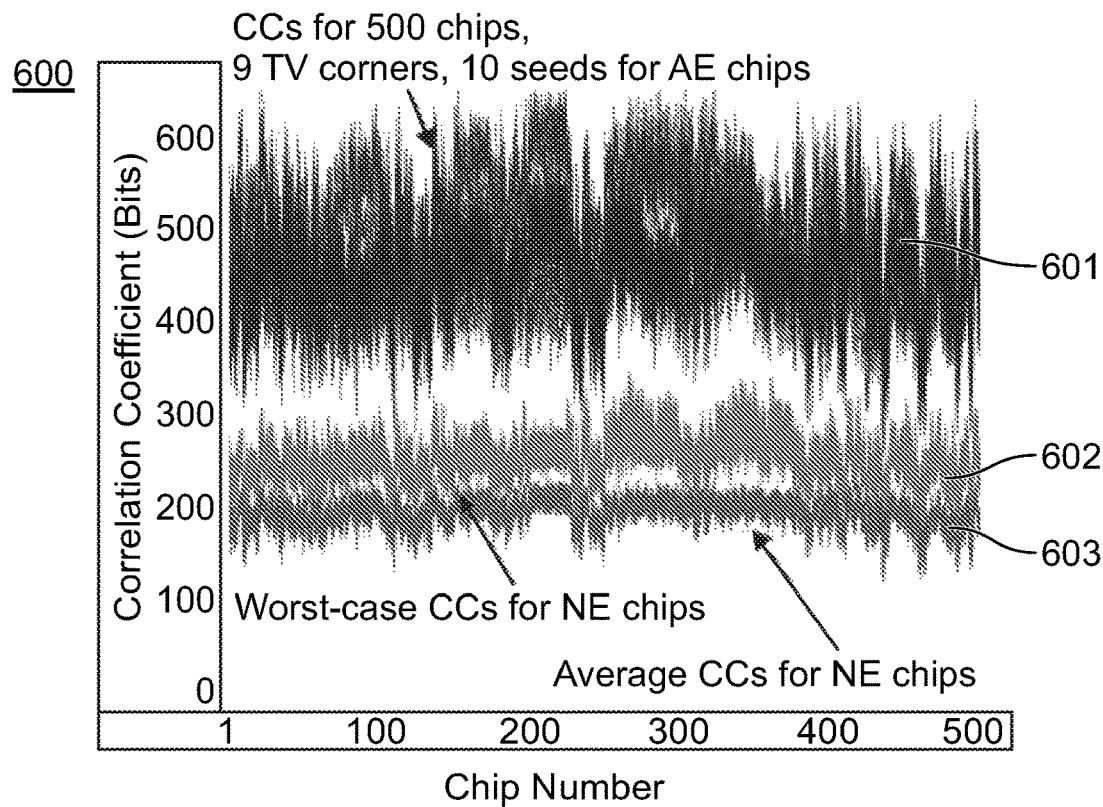
FIG. 8A illustrates a graph of correlation coefficient (bits) according to an embodiment of the invention.
Figure 8B:
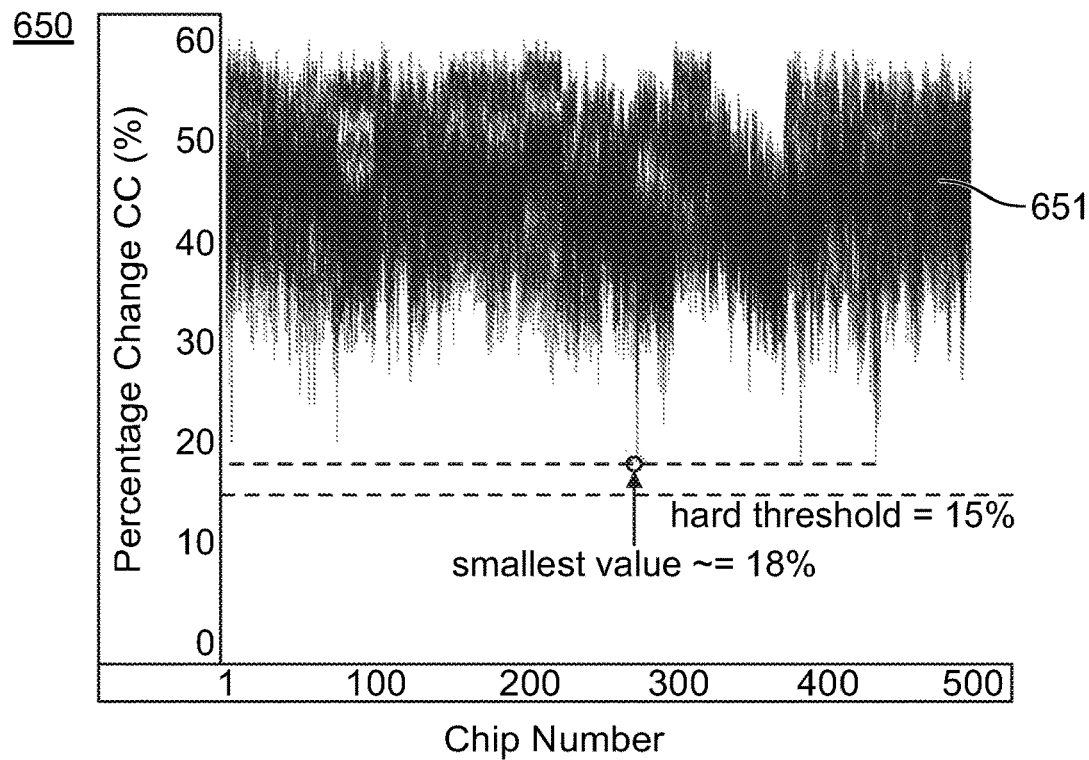
FIG. 8B illustrates a graph of percent change of the correlation coefficient (%) according to an embodiment of the invention
Figure 9A:
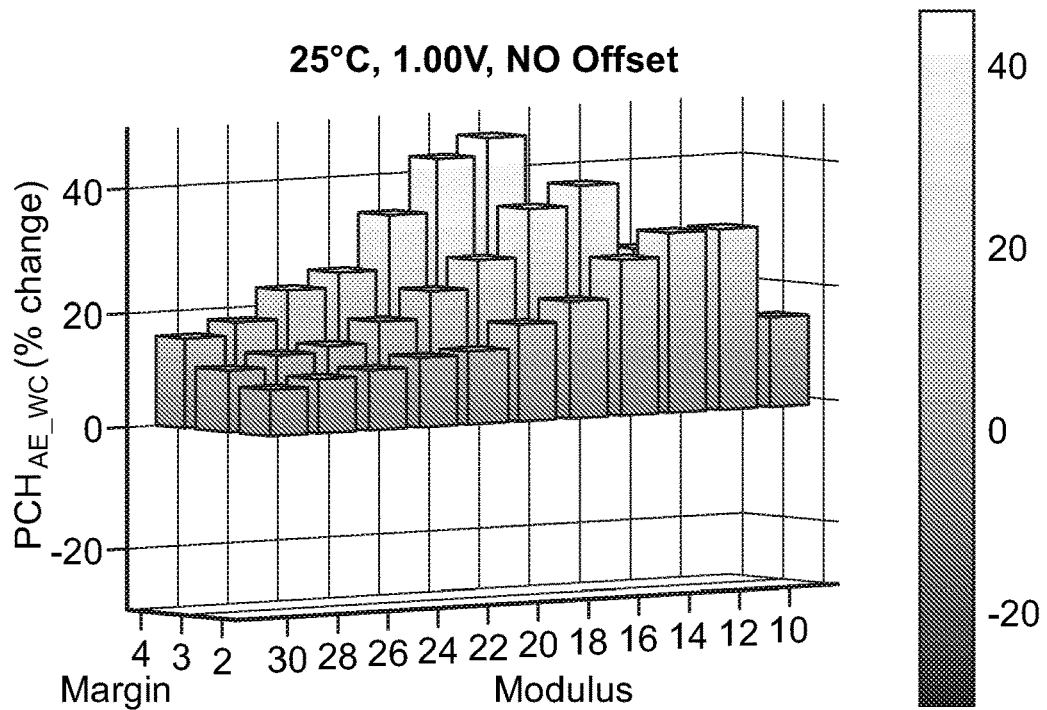
FIG. 9 illustrates graphs for worst case correlation coefficient ("CC") differences between authentic-enrolled ("AE") and non-authentic-enrolled ("NE") chips.
Figure 9B:
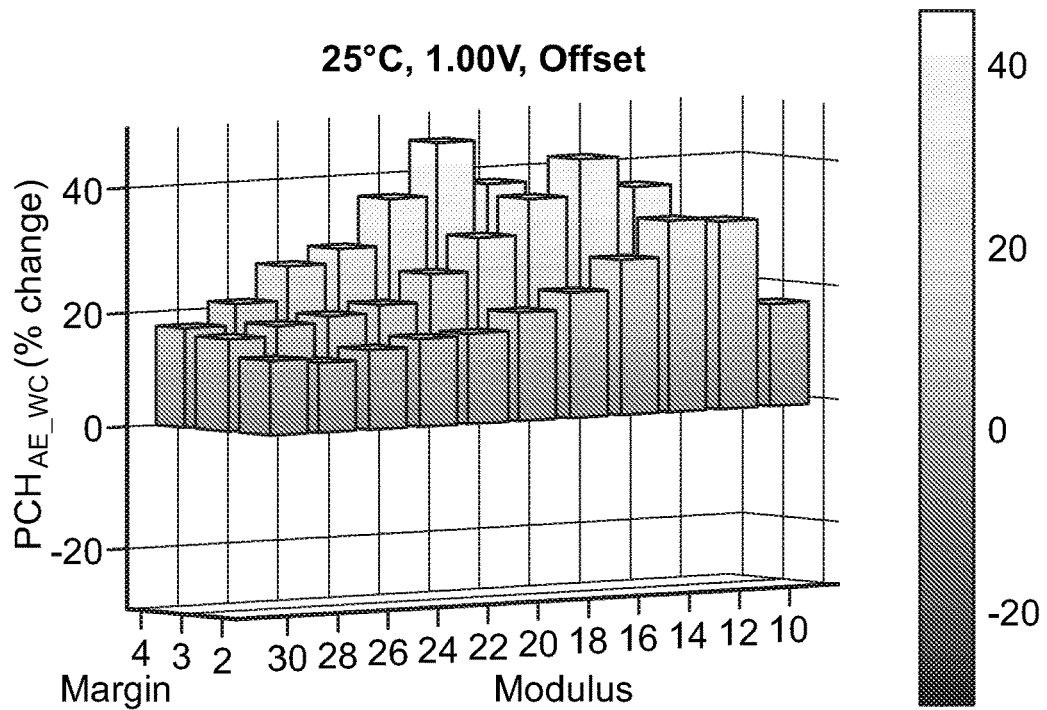
Figure 9C:
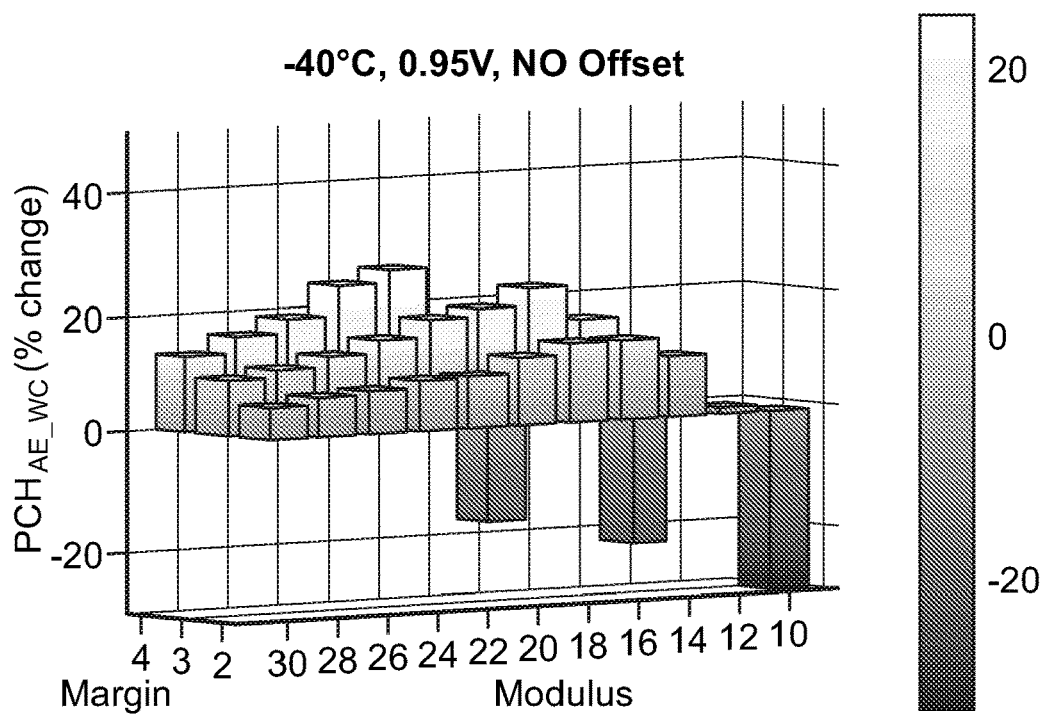
Figure 9D:
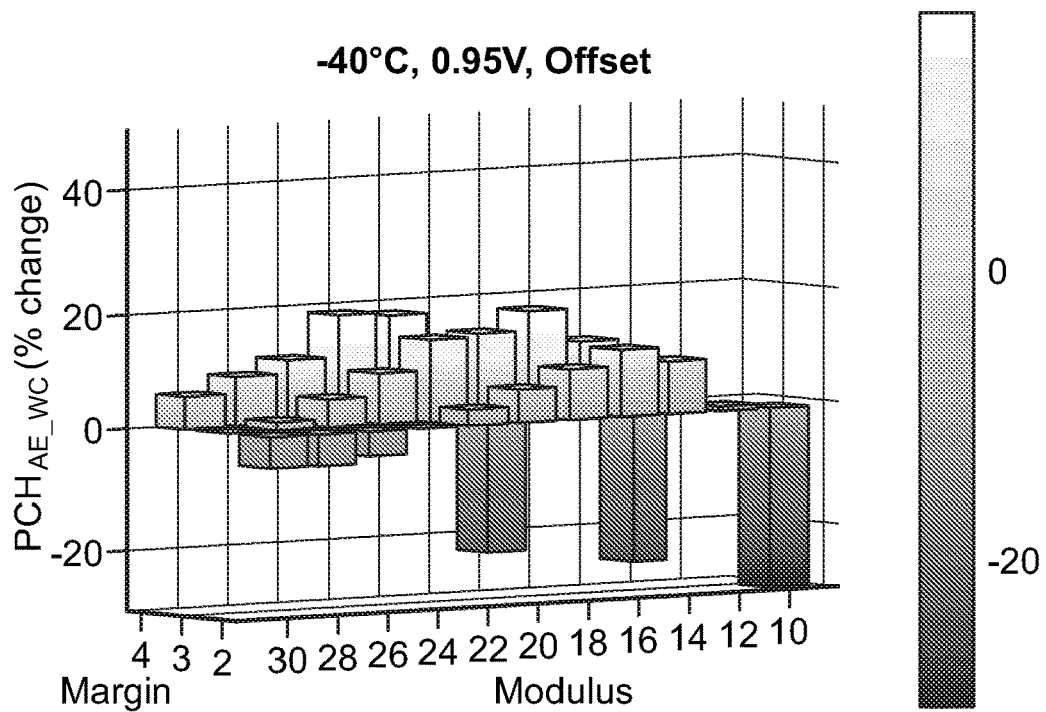
Figure 9E:
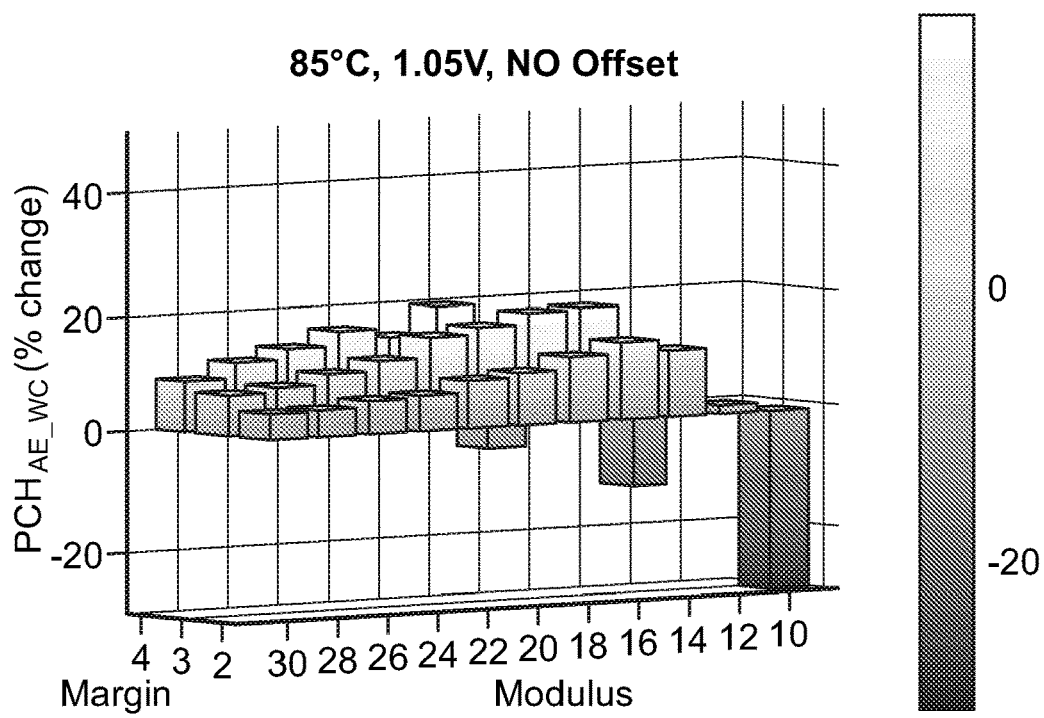
Figure 9F:
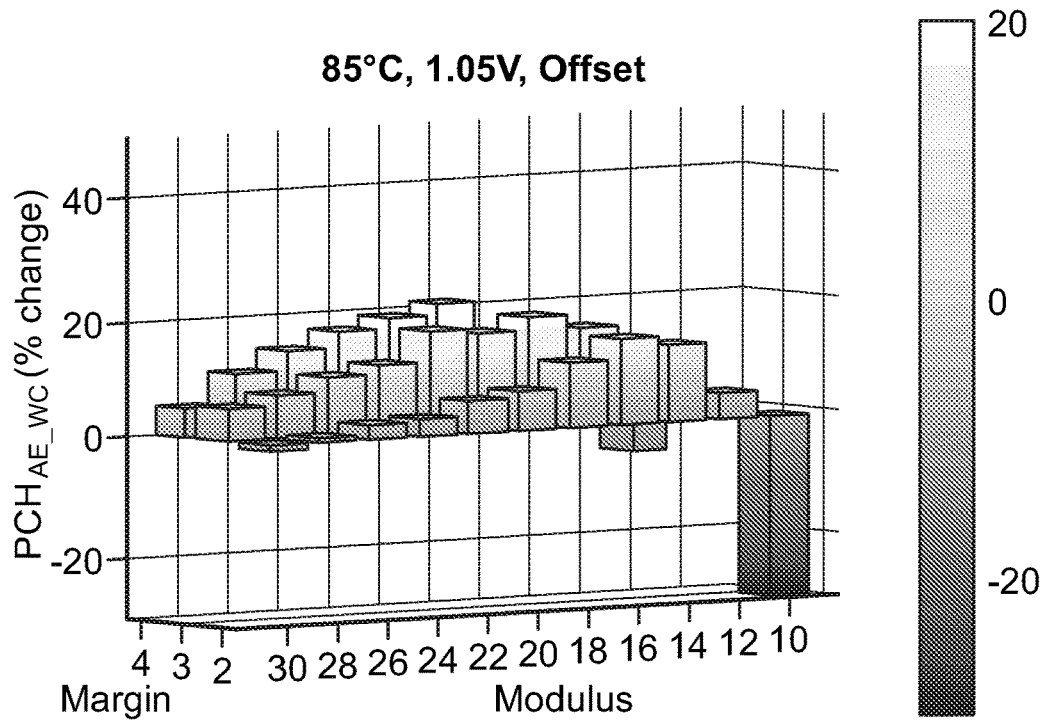

The approach taken for the analysis of the worst case is illustrated using the graph 600 of FIG. 8A and the graph 650 of FIG. 8B. The data presented is derived using only one Modulus and Margin in this embodiment, and is expanded to the larger set discussed below. The curves shown by 601 in FIG. 8A plot the CCs computed by the server when each of the 500 AE chips identified along the x-axis authenticates. These curves are constructed as described above, but now include data for all 500 chips and 9 TV corners shown (see chips in FIG. 6B), and for the 10 LFSR seeds. Therefore, there are 90 curves, each with 500 AE CCs. Similarly, the curves shown by 602 in FIG. 8A plot the worst-case (largest) NE CC among the remaining 499 CCs in each authentication attempt while the curves shown by 603 plot the average NE CC.

It should be noted that the curves shown in FIG. 8A are in a different format than the curves shown in FIG. 6A. In particular, the CCs in the curves 601 of FIG. 8A correspond to the AE chip only and the curves 602 plot only one CC (the worst case) from the 499 NE CCs in each of the curves of FIG. 6A. Therefore, only two points from each of the curves in FIG. 6A are plotted in FIG. 8A, and appear as column pairs in the curves 601 and 602. The two points in each pair represent the worst case (smallest) separation between the AE and NE CCs and visually portray how close a NE chip gets to being falsely authenticated as the AE chip on the server. In summary, the number of CC pairs is given by 500*9 TV corners*10 LFSR seeds=45,000. Note that each pair corresponds to 500 authentication attempts so in total, there are 45,000*500=22,500,000 (22.5M) authentication attempts.

As indicated, the key feature of FIG. 8A is the distance (separation) between pairs of points in the curves 601 and 602. This separation is key to the server's ability to distinguish between AE and NE, NN and NC chip authentications. Unfortunately, a hard threshold (horizontal line) between points cannot be drawn without some AE authentications failing (false negatives) and some NE authentications succeeding (false positives).

$$PCH = \frac{(CC_{largest} - CC_{2ndlargest})}{CC_{largest}} \quad \text{Equation (1)}$$

To deal with this issue, Equation (1) computes the percentage change CC, called PCH, as follows. First, a set of CCs are computed using the chip's Helper Data bitstring against each of the server computed Helper Data bitstrings. Then the two largest CCs are identified and plugged in Equation (1) to obtain the PCH value. The server successfully authenticates the chip if the PCH is larger than a hard threshold value, and fails otherwise. In cases where the authentication is successful, the soft data in the Enroll DB associated the largest CC, $CC_{largest}$, identifies the authenticating chip, $$PCH_{AE\_WC} = \frac{(CC_{AE} - CC_{worst\_case\_NE})}{CC_{AE}} \quad \text{Equation (2)}$$

The curves in FIG. 8B plot a closely related metric, defined as $PCH_{AE\_WC}$ in Equation (2), using the CCs from FIG. 8A.

Here, $CC_{AE}$ is associated with an AE chip obtained from the curves 601 in FIG. 8A and $CC_{worst\_case\_NE}$ is the other point in the pair obtained from curves 602. Although in practice the authenticate chip is not known, it turns out for every CC pair in FIG. 8A, $CC_{largest} = CC_{AE}$ and $CC_{2nd\_largest} = CC_{worst\_case\_NE}$. Therefore, Equation (1) and Equation (2) produce the same results for this set of CCs. In fact, the $PCH_{AE\_WC}$ would be negative if any of the $CC_{AE}$ is not the largest CC among the 500 generated by the server for the authentication attempt. The smallest $PCH_{AE\_WC}$ present is circled in FIG. 8B and is approx. 18%. This indicates that all of the $CC_{AE}$ are significantly larger than the NE CCs across the 22.5M authentications. Expressed in terms of bits, the smallest CC from FIG. 8A is approx. 300 bits. Therefore, the smallest separation between AE and NE CCs is approx. 300*0.18=54 bits. A hard threshold can now be defined, e.g., at 15% as shown in FIG. 8B, that enables the server to properly identify and authenticate chips with high probability.

Now, validation using a larger CRP space is discussed. An analysis reporting $PCH_{AE\_WC}$ is expanded to a set of 11 Moduli and 3 Margins. This analysis is repeated with and without Offsets. An Offset for the HELP algorithm can significantly improve the Entropy and uniqueness in the Strong bitstrings (labeled Strong BS in FIG. 3B, FIG. 3C, FIG. 4B, FIG. 4C). This is accomplished by having the server compute a set of Offsets using data from the Enrollment DB that are applied to the PN as shown in FIG. 3A and FIG. 4A before the PN are processed into bits using the Margining scheme. The offsets are small vertical shifts less than ½ the Modulus which optimize Entropy in each PN by ensuring that half of the chips in the population produce a '0' for the PN and half produce a '1'.

The Offset has very little impact on the CCs. The weak and strong regions in the graph 200 of FIG. 3A and graph 300 of FIG. 4A illustrate why this is true. Unlike the Strong bitstring values which are determined by the bit-flip lines at 0 and 10, the Helper Data bitstring values are determined by the four strong-weak region boundaries. The positions of these boundaries allow a Helper Data bit to flip between 0 and 1 in either of the strong bit regions labeled 'strong 0' and 'strong 1'. Therefore, offsetting the PN populations to improve the entropy associated with the Strong bitstring has little effect on the CCs. In fact, the correlation is slightly reduced based on the results shown in FIG. 9. Eliminating the overhead of computing and applying Offsets is yet another benefit of the correlation-based robust authentication technique over the known Strong bitstring approach.

FIG. 9 illustrates graphs for worst case correlation coefficient ("CC") differences between authentic-enrolled ("AE") and non-authentic-enrolled ("NE") chips expressed as percentage change using $PCH_{AE\_WC}$ in Equation (2) under best case environmental conditions (25° C., 1.00V on left) and worst case environmental conditions (−40° C., 0.95V in middle and 85° C., 1.05V on right) for 22.5M authentication attempts for Margins 2 through 4 and Moduli 10 through 30.

As shown in FIG. 9, the top row gives results with NO Offsets and bottom row gives results using Offsets, particularly Population Offsets. The bar heights represent the worst case $PCH_{AE\_WC}$ for a set of Moduli given along the x-axis and Margins given along the y-axis, Note that only one $PCH_{AE\_WC}$ is reported for each Margin-Moduli combination, and in particular, the value that corresponds to the circled point in FIG. 8B labeled 'smallest value', Negative height bars represent that at least one authentication failure has occurred, i.e., at least one $CC_{AE}$ is not the largest CC among the 500 CCs computed as discussed above.

Positive bars indicate server identifies AE chip correctly in all 22.5M authentications while negative bars indicate at least one false authentication with an NE chip occurred. Results for NO Offset are slightly better than results with Offsets applied.

More specifically, the two bar graphs in each of the three columns in FIG. 9 gives the results for 3 TV corners, namely 25° C., 1.00V on the left, −40° C., 0.95V in the middle and 85° C., 1.05V on the right. The latter two columns represent worst case TV corners, i.e., the results for the remaining 6 TV corners produce bars that are larger. From these results, it is clear that the Margin-Moduli combinations with negative bar heights that cannot be used in the privacy-preserving, mutual PUF-based authentication protocol.

However, Moduli between 18 to 24 for Margin 3 and between 22 and 28 for Margin 4 produce bar heights greater than 15% in the top row of 'NO Offset' bar graphs. Similar results are obtained in the Offset row but the bars are slightly smaller and therefore the hard threshold can be to be reduced to approx. 12% to avoid false negative authentications.

The bar graphs in the left column for TV corner 25° C., 1.00V show the best results. Only small differences exist between the No Offset and Offset results. And unlike the results for the other TV corners, the bar heights for all Moduli and Margins are positive, indicating that the values for CCAS are the largest among the sets of 22.5M authentications carried out in each analysis.

The privacy-preserving, mutual PUF-based authentication protocol exchanges and correlates Helper Data bitstrings instead of PUF response bitstrings as a means of authenticating chips. Helper Data is derived from the PUF response bitstrings and therefore the Helper Data bitstrings inherit the randomness and uniqueness characteristics associated with the PUF's source of entropy. By eliminating PUF response bitstrings in the message exchanges between the chip and server, attacks such as model-building are much more difficult to carry out.

The correlation-based robust authentication technique is demonstrated on a statistically significant set of FPGAs using the HELP algorithm, and a simple method thresholding method is used by the server and chip to distinguish between authentic and non-authentic chips.

As mentioned above, although HELP is used in this work, it is for exemplary purposes only. It is contemplated that the invention is applicable to any PUF that produces soft data, i.e., digitized values that capture the magnitude of signal behavior such as delay or metal resistance, including the Ring Oscillator ("RO") PUF and an enhanced version of arbiter PUF.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for authenticating an integrated circuit chip, the method including a message exchange protocol between a client and a server, and the method comprising the steps of:
   producing soft data by the client, wherein the client comprises a physical unclonable function (PUF) architecture;
   transmitting the soft data by the client to the server, wherein the soft data is stored in a server database;
   producing a response bitstrinq by the client to construct a client Helper Data bitstrinq;
   transmitting by the client the client Helper Data bitstrinq to the server;
   using by the server the soft data stored in the server database to construct a server Helper Data bitstring;
   correlating the client Helper Data bitstring and the server Helper Data bitstring to obtain a correlated Helper Data bitstring;
   counting a number of '1's in the correlated Helper Data bitstring by the server to determine a correlation coefficient value;
   comparing the correlation coefficient value to a threshold number; and
   authenticating the client by the server when the correlation coefficient value meets or exceeds the threshold number.

2. The message exchange protocol according to claim 1, wherein the soft data is digitized measurements of a signal.

3. The message exchange protocol according to claim 2, wherein the digitized measurements are one selected from group of: a propagation delay, a voltage, and a current.

4. The message exchange protocol according to claim 1, wherein the server Helper Data bitstring generated by the server and the client Helper Data bitstring generated by the client are correlated to determine a degree of matching that exists in a sequence of bits that define the server Helper Data bitstring and the client Helper Data bitstring.

5. The message exchange protocol according to claim 1, wherein bits in the response bitstring produced by the client are classified as either strong or weak.

6. The message exchange protocol according to claim 1, wherein the correlation coefficient value is used to mutually authenticate the client and the server.

7. The message exchange protocol according to claim 1, wherein the client or the server is not revealed to third parties.

* * * * *

UNITED STATES PATENT AND TRADEMARK OFFICE
CERTIFICATE OF CORRECTION

PATENT NO. : 11,411,751 B2
APPLICATION NO. : 17/256127
DATED : August 9, 2022
INVENTOR(S) : James Plusquellic It is certified that error appears in the above-identified patent and that said Letters Patent is hereby corrected as shown below:

On the Title Page

Item (12) delete "Plusquellic et al." and insert -- Plusquellic --.

Under item (72) Inventors, "Matt Areno" should be deleted.

Signed and Sealed this
Thirteenth Day of August, 2024

Katherine Kelly Vidal
*Director of the United States Patent and Trademark Office*